United States Patent
Wang et al.

(10) Patent No.: US 11,866,607 B2
(45) Date of Patent: Jan. 9, 2024

(54) LOW VOC, HIGH SOLID DECK MEMBRANES

(71) Applicant: SIKA TECHNOLOGY AG, Baar (CH)

(72) Inventors: Chia Wang, Shakopee, MN (US); Brian Mullen, Shakopee, MN (US); Roland Pavek, Shakopee, MN (US)

(73) Assignee: SIKA TECHNOLOGY AG, Baar (CH)

(*) Notice: Subject to any disclaimer, the term of this patent is extended or adjusted under 35 U.S.C. 154(b) by 113 days.

(21) Appl. No.: 17/404,394

(22) Filed: Aug. 17, 2021

(65) Prior Publication Data
US 2021/0380837 A1    Dec. 9, 2021

Related U.S. Application Data

(62) Division of application No. 16/478,779, filed as application No. PCT/EP2017/053351 on Feb. 15, 2017, now Pat. No. 11,279,845.

(51) Int. Cl.
| | |
|---|---|
| C09D 175/04 | (2006.01) |
| C09D 7/20 | (2018.01) |
| C08G 18/12 | (2006.01) |
| C08G 18/62 | (2006.01) |
| C08G 18/76 | (2006.01) |

(52) U.S. Cl.
CPC .......... *C09D 175/04* (2013.01); *C08G 18/12* (2013.01); *C08G 18/6204* (2013.01); *C08G 18/7614* (2013.01); *C09D 7/20* (2018.01)

(58) Field of Classification Search
CPC .. C09D 175/04; C09D 175/06; C09D 175/08; C08G 18/10; C08G 18/12; C08G 18/76; C08G 18/7614; C08G 18/7657
See application file for complete search history.

(56) References Cited

U.S. PATENT DOCUMENTS

| 5,670,599 A | 9/1997 | Bassner |
| 2009/0186543 A1 | 7/2009 | Keshavaraj et al. |

(Continued)

FOREIGN PATENT DOCUMENTS

| EP | 0731119 A2 | 9/1996 |
| WO | 2015107933 A1 | 7/2015 |

OTHER PUBLICATIONS

International Search Report for International Application No. PCT/EP2017/053351 dated Oct. 30, 2017.

(Continued)

*Primary Examiner* — Michael M Dollinger
(74) *Attorney, Agent, or Firm* — Oliff PLC

(57) ABSTRACT

A basecoat coating composition includes an aromatic polyurethane pre-polymer having isocyanate terminal end groups, a first solvent and optionally a second VOC-exempt solvent, in which the total composition formulation has a VOC content of less than 97 g/L. A topcoat coating composition includes an aliphatic polyurethane pre-polymer having isocyanate terminal end groups, a first solvent and optionally a second VOC-exempt solvent, in which the total composition formulation has a VOC content of less than or equal to 95 g/L. The total composition formulations of the basecoat and/or topcoat may have a VOC content of less than 50 g/L. A membrane system may include an optional primer coating, and the above described basecoat and topcoat coating compositions.

11 Claims, 2 Drawing Sheets

(56) References Cited

U.S. PATENT DOCUMENTS

2009/0280709 A1  11/2009  Rukavina et al.
2016/0024318 A1   1/2016  Byrne et al.

OTHER PUBLICATIONS

Written Opinion of the International Searching Authority for International Application No. PCT/EP2017/053351 dated Oct. 30, 2017.

LOW VOC, HIGH SOLID DECK MEMBRANES

This is a divisional application of U.S. Ser. No. 16/478,779, filed Jul. 17, 2019, which is a national stage application of International Application No. PCT/EP2017/053351, filed Feb. 15, 2017. Applicant incorporates by reference the entirety of each of the foregoing documents herein, and claims all available priority benefit to each of the above applications.

The present disclosure is directed to polyurethane compositions for use in coatings and membranes for structures such as parking decks or garages, plaza decks, balconies, stadiums, commercial construction, building and restoration. The substrate may be concrete, plywood or other similar type substrates or surfaces.

Annually, parking garage owners spend hundreds of millions of dollars repairing and protecting the structural slabs in their parking structures from deicing salts. One integral part of this process is the installation of traffic bearing membranes to keep deicing salts from penetrating the structure.

Manufacturers of deck coatings have come under increasing pressure to eliminate volatile organic compounds ("VOCs") from formulations. VOC laws are becoming increasingly more stringent throughout North America. The VOC content in current polyurethane deck membrane products are varied from 150 g/L to 200 g/L or higher. An alternate approach is to use VOC-exempt solvents such as methyl formate and parachlorobenzotrifluoride (PCBTF) in the formulation either as a component(s) of a solvent blend or as the sole solvent in the formulation. Unfortunately, these solvents have performance features that limit their use in high solids, high performance polyurethane coatings. Another approach is to sufficiently reduce the VOC content of the formulation by reducing or removing the VOC-type solvent. However, it is often the case that removal or a significant reduction of the VOC-type solvent negatively effects the viscosity, cost, and surface properties of the coating.

What is needed is a high solids, high performance polyurethane coating or membrane that is formulated to use VOC-exempt solvents while still meeting strict performance criteria.

SUMMARY

Provided is a basecoat coating formulation comprising an aromatic polyurethane pre-polymer having isocyanate terminal end groups, a first solvent and optionally a second VOC-exempt solvent, a catalyst, and at least one filler, in which the total formulation has a VOC content of less than 97 g/L,
  the pre-polymer having an equivalent molecular weight of about 500-10000 g/mol and an NCO/OH ratio of about 1.1 to about 5, and being the reaction product of about 51 wt % to about 100 wt % aromatic polyisocyanate, 0 wt % to about 49 wt % aliphatic polyisocyanate, and a polyol selected from the group consisting of polyalkylene polyols, polyester polyols, and polycarbonate polyols, wherein the weight percent of polyol to polyisoisocyanate reacted to form the pre-polymer is in the range of about 85 to about 95% by weight, based on the weight of the pre-polymer,
  wherein the weight percent of the pre-polymer based on the weight of the total basecoat coating formulation is about 55.4% to about 95%, and the total weight percent solids in the base coat formulation is greater than 84% to about 99%, and,
  wherein the total formulation viscosity is less than 80 poise at greater than 84% solids.

Also provided is a topcoat coating formulation comprising an aliphatic polyurethane pre-polymer having isocyanate terminal end groups, a first solvent and optionally a second VOC-exempt solvent, a catalyst, and at least one filler, in which the total formulation has a VOC content of less than or equal to 95 g/L,
  the prepolymer having an equivalent molecular weight of about 500-10000 g/mol and an NCO/OH ratio of about 1.1 to 3.3, and being the reaction product of about 51 wt % to about 100 wt % aliphatic polyisocyanate, 0 wt % to about 49 wt % aromatic polyisocyanate, and a polyol selected from the group consisting of polyalkylene polyols, polyester polyols, and polycarbonate polyols, wherein the weight percent of polyol to polyisocyanate reacted to form the pre-polymer is in the range of between about 57 to about 87% by weight, based on the weight of the pre-polymer,
  wherein the weight percent of the pre-polymer based on the weight of the total topcoat coating formulation is about 57.7% to about 95%, and the total weight percent solids in the topcoat coating formulation is greater than 82% to about 99%, and
  wherein the total formulation viscosity is less than 80 poise at greater than 82% solids.

Also provided is a membrane system comprising an optional primer coating, a basecoat and a topcoat, wherein the basecoat is formed from a basecoat coating formulation comprising an aromatic polyurethane pre-polymer having isocyanate terminal end groups, a first solvent and optionally a second VOC-exempt solvent, a catalyst, and at least one filler, in which the total composition formulation has a VOC content of less than 97 g/L, the basecoat pre-polymer having an equivalent molecular weight of about 500-10000 g/mol and an NCO/OH ratio of about 1.1 to about 5, and being the reaction product of about 51 wt % to about 100 wt % aromatic polyisocyanate, 0 wt % to about 49 wt % aliphatic polyisocyanate, and a polyol selected from the group consisting of polyalkylene polyols, polyester polyols, and polycarbonate polyols, wherein the weight percent of polyol to polyisoisocyanate reacted to form the basecoat pre-polymer is in the range of about 85 to about 95% by weight, based on the weight of the basecoat pre-polymer,
  wherein the weight percent of the basecoat pre-polymer based on the weight of the total basecoat coating formulation is about 55.4% to about 95%, and the total weight percent solids in the base coat formulation is greater than 84% to about 99%, and
  wherein the total basecoat formulation viscosity is less than 80 poise at greater than 84% solids; and
  wherein the topcoat coating formulation comprising an aliphatic polyurethane pre-polymer having isocyanate terminal end groups, a first solvent and optionally a second VOC-exempt solvent, a catalyst, and at least one filler, in which the total topcoat coating formulation has a VOC content of less than or equal to 95 g/L,
  the topcoat prepolymer having an equivalent molecular weight of about 500-10000 g/mol and an NCO/OH ratio of about 1.1 to 3.3, and being the reaction product of about 51 wt % to about 100 wt % aliphatic polyisocyanate, 0 wt % to about 49 wt % aromatic polyisocyanate, and a polyol selected from the group consisting of polyalkylene polyols, polyester polyols, and polycarbonate polyols, wherein the weight percent of polyol to polyisocyanate reacted to form the topcoat pre-polymer is in the range of between about 57 to about 87% by weight, based on the weight of the topcoat pre-polymer, wherein the weight percent of the topcoat pre-polymer based on the weight of the total topcoat coating formulation is about 57.7% to about 95%, and the total weight percent solids in the topcoat coating formulation is greater than 82% to about 99%, and wherein the total topcoat formulation viscosity is less than 80 poise at greater than 82% solids.

Also provided is a method of producing a coating membrane having a basecoat and a topcoat, comprising treating a substrate, applying a moisture curable basecoat coating formulation to the substrate, and after drying, applying a moisture curable topcoat coating formulation to the basecoat, the basecoat and topcoat coating formulations being as defined in claim 16, optionally followed by broadcasting aggregate onto the topcoat.

DETAILED DESCRIPTION

Figure 1:
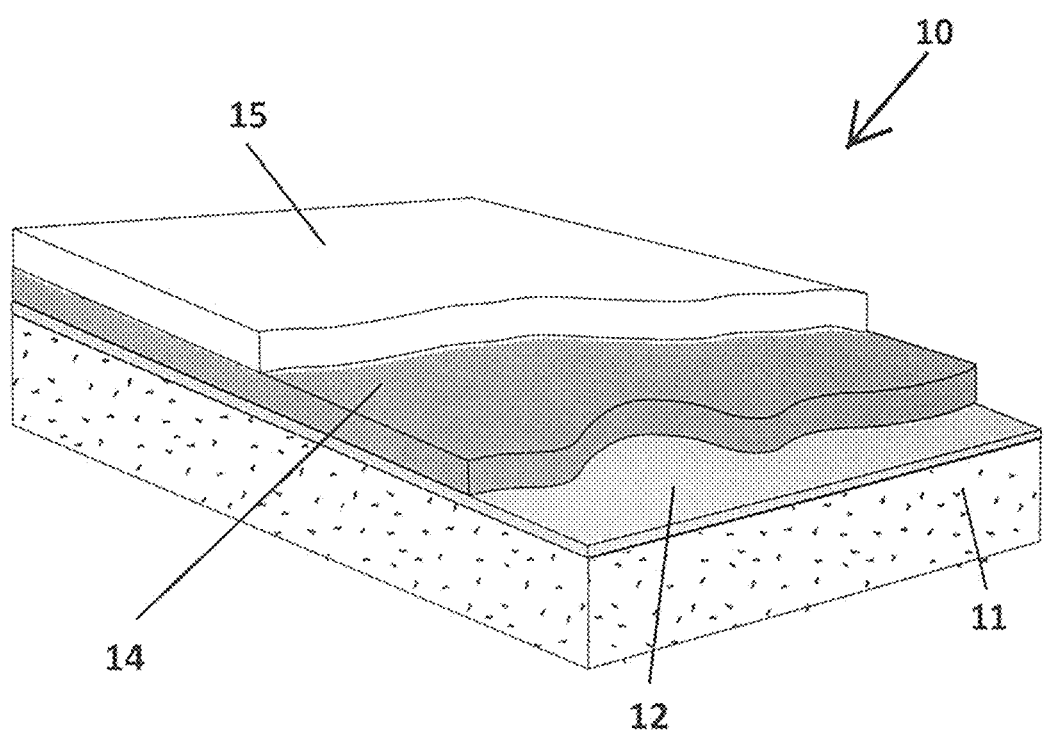
FIG. 1 is a cutaway perspective view of a polyurethane membrane comprising an optional primer over the substrate, a basecoat and a topcoat.

Provided is a low-solvent and low-VOC basecoat and topcoat coating or membrane system, comprising a combination of high-solids polyurethane components, optionally one component polyurethanes, and optionally VOC-exempt solvents. In the polyurethane basecoat structure, the polymer NCO/OH ratio may be varied, while the final % NCO may be greater than 1.5% in order to achieve a lower average molecular weight, such as less than about 2600 g/mol, while the total formulation viscosity is kept under 80 poise at greater than 84% solids to provide a high solids, flowable coating. In the polyurethane topcoat structure, the polymer has a lower than conventional NCO/OH ratio (NCO/OH<3.3) and the average molecular weight may be increased to greater than 550 g/mol as compared to conventional topcoat formulations, while the total formulation viscosity is kept under 80 poise at greater than 82% solids to provide a high solids, flowable coating.

Use of the presently claimed basecoat and topcoat is much safer for the environment, and it is practical and convenient to use the VOC-exempt solvents compared to conventional lower-solids formulations with more highly volatile organic compounds. The products may be manufactured in a conventional commercial operation, and the products may be applied in the field. The VOC contents of the subject products are less than 97 g/L for the basecoat, and less than or equal to 95 g/L for the topcoat, and may further be as low as about 50 g/L, while still meeting performance criteria for deck coatings, and the like.

A solvent mixture comprising a combination of VOC solvents and VOC-exempt solvents may be utilized to achieve a proper balance of product formulation properties and cost.

In general, the subject topcoat coating formulations use a lower amount of expensive cycloaliphatic isocyanate and a greater weight percent of polyols than conventional topcoat formulations, achieving a less costly formulation, while accomplishing good performance characteristics by modification of the urethane structure. However, existing raw materials and manufacturing processes may be utilized to manufacture the coatings, such as deck membranes, with low VOC characteristics.

The VOC content in current deck coating products may generally vary from 150 g/L to 200 g/L, or higher. The subject embodiments reduce VOC content of the formulations to less than 97 g/L for the basecoat, and less than or equal to 95 g/L for the topcoat, utilizing high-solids components. The VOC content may be further reduced to 50 g/L or less including the combination of high-solids components and VOC-exempt solvents.

The polyurethane basecoat final product comprises the reaction product of a reactant formulation comprising (a) a polyol; (b) an aromatic isocyanate; and optionally (c) at least one catalyst, (d) a pigment or colorant, and/or (e) a plasticizer and further optional components. The molar ratio of isocyanate to polyol (NCO/OH) in the basecoat is between about 1.1 to about 5 in certain embodiments, and in other embodiments may be between about 1.7 to about 3. The % NCO of the basecoat reaction product may be in a range between about 1.5% to about 4%, in some embodiments in the range of 1.6% to about 3%. The polyurethane prepolymer of the basecoat may optionally comprise some amount of aliphatic and/or cycloaliphatic isocyanate. The percentage of aliphatic isocyanate relative to aromatic isocyanate may be between 0 wt % and 49 wt %.

The polyurethane topcoat final product comprises the reaction product of a reactant formulation comprising (a) a polyol; (b) an aliphatic and/or cycloaliphatic isocyanate; and optionally (c) at least one catalyst, (d) a pigment or colorant, and/or (e) a plasticizer and further optional components. The molar ratio of isocyanate to polyol (NCO/OH) in the topcoat is between about 1.1 to about 3.3 in certain embodiments, and in other embodiments may be between about 1.5 and about 3.25. The topcoat coating reaction product may have a % NCO in a range of about 3.5% to about 6%. The polyurethane prepolymer of the topcoat may optionally comprise some amount of aromatic isocyanate. The percentage of aromatic isocyanate relative to aliphatic isocyanate may be between 0 wt % and 49 wt %. The aliphatic polyisocyanate of the topcoat pre-polymer may comprise a cycloaliphatic polyisocyanate.

For illustration purposes but not by way of limitation, the polyol may be selected from the group consisting of polyalkylene polyols, polyester polyols, and polycarbonate polyols. The polyoxyalkylene polyol may be selected from the group consisting of polyethylene glycols, polypropylene glycols, polypropylene glycol-polyethylene glycol copolymers, polytetramethylene glycols, polycaprolactone diols and triols, and combinations thereof. Low molecular weight diols and triols may also be useful polyols in the subject formulations. Low molecular weight alcohols such as, ethylene glycol, 1,3-butanediol, diethylene glycol, dipropylene glycol, 1,2-propylene glycol, 1,3-propylene glycol, 1,4-butylene glycol, 2,2-dimethyl-1,3-propane-diol, and mixtures of these aliphatic polyols may be useful polyol components of the subject formulations.

Polyoxyalkylene polyols include polyether polyols prepared by the copolymerization of cyclic ethers selected from the group consisting of ethylene oxide, propylene oxide, trimethylene oxide, tetrahydrofuran, and mixtures of these cyclic ethers, with aliphatic polyols selected from the group consisting of ethylene glycol, 1,3-butanediol, diethylene glycol, dipropylene glycol, 1,2-propylene glycol, 1,3-propylene glycol, 1,4-butylene glycol, 2,2-dimethyl-1,3-propane-diol, and mixtures of these aliphatic polyols. The polyether polyols are functionalized with OH moieties, and optionally may comprise polyalkylene glycols capped with a different alylene diol or triol, such as polypropylene glycol capped with (poly)ethylene diols or triols.

Representative examples of suitable polyoxyalkylene polyols include Pluracol CASE polyether polyols commercially available from BASF Corporation (Wyandotte MI). The polyol may have a nominal functionality of 2-6, preferably between 2-4, and more preferably 2 or 3.

In certain embodiments, the polyoxyalkylene polyol of the polyurethane sealant may have a molecular weight in the range of about 500 to about 20,000. In other embodiments, the polyol may have a molecular weight in the range of about 1,000 to about 12,000. In some embodiments, the polyol may have a molecular weight in the range of about 1,000 to about 6,000. In another embodiment, the polyol may comprise a polypropylene glycol with a number average molecular weight in the range of about 1,000 to about 6,000, and the polypropylene glycol may have a degree of unsaturation of less than about 0.04 meq/g. The molecular weight is either a calculated molecular weight, i.e. the sum of the atomic weights of the atoms making up the material, or the molecular weight is a number average molecular weight determined based on end group analysis or measurement of colligative properties by ebulliometry, cryoscopy, or membrane osmometry.

For purposes of illustration but not by way of limitation, the isocyanate(s) may have an average functionality equal to about 2.

For purposes of illustration but not by way of limitation, the isocyanates may comprise at least one of toluene diisocyanates, methylene diphenyl diisocyanates, phenylene diisocyanate, xylylene diisocyanate, diphenylmethane diisocyanate, polyphenylmethane polyisocyanate (Polymeric MDI), naphthalene diisocyanate, triphenylmethane triisocyanate, diphenyl sulfone diisocyanate, cyclohexane diisocyanates, ethylene diisocyanate, propylene diisocyanate, tetramethylene diisocyanate, hexamethylene diisocyanates, isophorone diisocyanate, dimers and trimers of these diisocyanates or mixtures thereof.

For purposes of illustration but not by way of limitation, in certain embodiments, the isocyanate may comprise at least one of toluene 2,4-diisocyanate, toluene 2,6-diisocyanate, naphthylene 1,5-diisocyanate, 4,4'-methylene diphenyl diisocyanate, 2,4'-methylene diphenyl diisocyanate, 1-methyl-2,4-diisocyanatocyclohexane, 1-methyl-2,6-diisocyanatocyclohexane, 4,4'-dicyclohexylmethane diisocyanate, uretodione diisocyanate, isocyanurate trisocyanate, hexamethylene-1,6-diisocyanate, tetramethylene-1,4-diisocyanate, cyclohexane-1,4-diisocyanate, hexahydrotolylene diisocyanate (and isomers), 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyl-diphenylmethane-4,4'-diisocyanate, dimers and trimers of these isocyanates, or mixtures thereof.

For purposes of illustration but not by way of limitation, in some embodiments the isocyanate may comprise at least one of 1-isocyanatomethyl-3-isocyanato-1,5,5-trimethyl diisocyanate (isophorone diisocyanate, IPDI), toluene diisocyanate (TDI), methylene diphenyl diisocyanate (MDI), 4,4'-dicyclohexylmethane diisocyanate, or mixtures thereof.

For purposes of illustration but not by way of limitation, in certain embodiments the isocyanate used in the basecoat may be a toluene diisocyanate (TDI), commercially available as Lupranate™ T80 marketed by BASF Corporation.

For purposes of illustration but not by way of limitation, in certain embodiments, the isocyanate used in the topcoat may be a monomeric cycloaliphatic diisocyanate commercially available as Desmodur™ W (dicyclohexylmethane-4,4'-diisocyanate $H_{12}MDI$) marketed by Bayer Material Science.

The polyol is typically reacted with a molar excess of polyisocyanate in a reaction formulation to produce a reaction product containing an isocyanate-terminated polyurethane pre-polymer. The amount of polyisocyanate used is sufficient to provide a ratio of isocyanate equivalence to polyol equivalence (NCO/OH ratio) in the basecoat of about 1.1 to about 5 in certain embodiments, and in other embodiments about 1.7 to about 3. The NCO/OH ratio in the topcoat is between about 1.1 to about 3.3 in certain embodiments, and in other embodiments between about 1.5 and about 3.25.

The weight percent of polyol to polyisocyanate reacted to form the pre-polymer for the basecoat may be in the range of between about 85 to about 95% by weight, in certain embodiments about 86% to about 93% by weight, based on the weight of the pre-polymer. The weight percent of polyol to polyisocyanate reacted to form the pre-polymer for the topcoat may be in the range of between about 57 to about 87% by weight, in certain embodiments about 63 to about 80% by weight, based on the weight of the pre-polymer.

For purposes of illustration but not by way of limitation, the reactant formulation additionally may comprise additional solvent, and optionally at least one catalyst, and/or plasticizer. In certain embodiments, the reactant formulation may additionally comprise at least one of organic fillers, inorganic fillers, a pigment or colorant, a plasticizer or surfactant, chain extenders, antioxidants, UV stabilizers, light stabilizers, thermal stabilizers, fungicides, mildewcides, biocides, fire retardants, surface additives, coloring agents, mineral oils, dispersing agents, adhesion promoters, defoaming agents, storage stabilizers, latent hardeners, cure retarders, drying agents, lubricants, suspension aids, blocking agents, or mixtures thereof.

In one embodiment the total amount of such additives can be about 10 to about 50 weight percent; and in some embodiments about 25 to about 40 weight percent, based on the total weight of the reaction product.

TABLE 1

LIST OF EXEMPT COMPOUNDS (40CFR51.100 (s), revised as of Jul. 1, 2003)
Volatile organic compounds (VOC) means any compound of carbon excluding carbon monoxide, carbon dioxide, carbonic acid, metallic carbides or carbonates, and ammonium carbonate, which participates in atmospheric photochemical reactions. This includes any such organic compounds other than the following, which have been determined to have negligible photochemical reactivity:
methane
ethane
methylene chloride (dichloromethane)
1,1,1-trichloroethane (methyl chloroform)
1,1,2-trichloro-1,2,2-trifluoroethane (CFC-113)
trichlorofluoromethane (CFC-11)
dichlorodifluoromethane (CFC-12)
chlorodifluoromethane (HCFC-22)
trifluoromethane (HFC-23)
1,2-dichloro 1,1,2,2-tetrafluoroethane (CFC-114)
chloropentafluoroethane (CFC-115)
1,1,1-trifluoro 2,2-dichloroethane (HCFC-123)
1,1,1,2-tetrafluoroethane (HCFC-134a)
1,1-dichloro-1-fluoroethane (HCFC-141b)

TABLE 1-continued

LIST OF EXEMPT COMPOUNDS (40CFR51.100 (s), revised as of Jul. 1, 2003)
Volatile organic compounds 1-chloro-1,1-difluoroethane (HCFC-142b)
2-chloro-1,1,1,2-tetrafluoroethane (HCFC-124)
pentafluoroethane (HFC-125)
1,1,2,2-tetrafluoroethane (HFC-134)
1,1,1-trifluuoroethane (HFC-143a)
1,1-difluoroethane (HFC-152a)
parachlorobenzotrifluoride (PCBTF)
cyclic, branched, or linear completely methylated siloxanes
acetone
perchloroethylene (tetrachloroethylene)
3,3-dichloro-1,1,1,2,2-pentafluoropropane (HCFC-225ca)
1,3-dichloro-1,1,2,2,3-pentafluoropropane (HCFC-225cb)
1,1,1,2,3,4,4,5,5,5-decafluoropentane (HFC-43-10mee)
difluoromethane (HFC-32)
ethylfluoride (HFC-161)
1,1,1,3,3,3-hexafluoropropane (HFC-236fa)
1,1,2,2,3-pentafluoropropane (HFC-245ca)
1,1,2,3,3-pentafluoropropane (HFC-245ea)
1,1,1,2,3-pentafluoropropane (HFC-245eb)
1,1,1,3,3-pentafluoropropane (HFC-245fa)
1,1,1,2,3,3-hexafluoropropane (HFC-236ea)
1,1,1,3,3-pentafluorobutane (HFC-365-mfc)
chlorofluoromethane (HCFC-31)
1-chloro-1-fluoroethane (HCFC-151a)
1,2-dichloro-1,1,2-trifluoroethane (HCFC-123a)
1,1,1,2,2,3,3,4,4-nonafluoro-4-methoxy-butane (C4F9OCH3)
2-(difluoromethoxymethyl)-1,1,1,2,3,3,3-
heptafluoropropane ((CF3)2CFCF2OCH3)
1-ethoxy-1,1,2,2,3,3,4,4,4-nonafluorobutane (C4F9OC2H5)
2-(ethoxydifluoromethyl)-1,1,1,2,3,3,3-heptafluoropropane
((CF3)2CFCF2OC2H5) methyl acetate and perfluorocarbon
compounds which fall into these classes:
(i.) Cyclic, branched, or linear, completely fluorinated alkanes (ii.)
Cyclic, branched, or linear, completely fluorinated ethers with no
unsaturations (iii.) Cyclic, branched, or linear, completely fluorinated
tertiary amines with no unsaturations (iv.) Sulfur containing
perfluorocarbons with no unsaturations and with sulfur bonds only to
carbunsaturations (iv.) Sulfur containing perfluorocarbons with no
unsaturations and with sulfur bonds only to carbon and fluorine Under U.S. EPA regulations, a chemical is VOC-exempt, if it: has vapor pressure of less than 0.1 millimeters of mercury (at 20 degrees Celsius); or, if the vapor pressure is unknown: consists of more than 12 carbon atoms; or has a melting point higher than 20 degrees C. and does not sublime (i.e., does not change directly from a solid into a gas without melting).

For the basecoat and topcoat formulations, a first solvent may be selected from mineral spirits, xylene, toluene, or Aromatic 100™. Aromatic 100 is a Light Aromatic Solvent, (Petroleum) Naphtha, a mixture composed primarily of $C_{9-10}$ dialkyl and trialkylbenzenes. In certain embodiments, a second solvent may be used that is a VOC exempt solvent as described above. The second solvent may be p-chlorobenzotrifluoride (PCBTF), isomers of PCBTF, methyl formate, and certain chlorinated solvents.

In certain embodiments the second solvent does not include a solvent selected from acetone, methyl acetate, methylene chloride, propylene carbonate, butyl acetate, siloxanes, or water.

The performance features of the polyurethane polymers of the basecoat and topcoat compositions are improved with modification of urethane structures, such as the NCO/OH ratios, final NCO %, amount of polyols, and selection of the type of polyols, as disclosed and exemplified herein, to obtain the desired properties for deck coating applications and the like. Such features include viscosity, cure time, elongation, strength, modulus, and hardness.

For the base coat composition, the final NCO % in the pre-polymer may be about 0.1% to 10%, in certain embodiments about 0.5% to 9%, in some embodiments about 2%-6%, and in other embodiments about 1.5 to about 4%. The equivalent molecular weight of the basecoat pre-polymer is typically about 500-10000 g/mol, in certain embodiments about 700-5000 g/mol, and in some embodiments about 1500-4000 g/mol. The weight percent total solids in the base coat formulation embodiments which have a VOC less than 97 g/L is about 84 to about 99%, in certain embodiments about 84 to about 98%, and in some embodiments about 85 to about 95%. The weight percent of the polymer based on the total basecoat formulation is about 55.4 to about 95%, in certain embodiments about 60 to about 90%, and in some embodiments about 65 to 85%.

The base coat coating pre-polymer reaction product may have, in various or in combined embodiments, a tensile strength of greater than 400 psi, a 100% modulus of greater than 175 psi, an elongation of greater than 800%, and/or a hardness of less than 70 Shore A.

For the top coat composition, the final NCO % in the pre-polymer may be about 0.1% to 10%, in certain embodiments about 0.5% to 9%, in some embodiments about 2%-8%%, and in other embodiments about 3.5 to about 6%. The equivalent molecular weight of the topcoat pre-polymer is typically about 500-10000 g/mol; in certain embodiments about 700-5000 g/mol, and in some embodiments about 800-2000 g/mol. The weight percent total solids in the topcoat formulation embodiments which have a VOC content less than or equal to 95 g/L is about 82 to about 99% in certain embodiments about 83 to about 98%, and in some embodiments about 85 to about 95%. The weight percent of the polymer based on the total topcoat formulation is about 57.7 to about 95%, in certain embodiments about 60 to about 90%, and in some embodiments about 65 to about 85%.

The topcoat coating pre-polymer reaction product may have, in various or in combined embodiments, a tensile strength of greater than 2400 psi, a 100% modulus of greater than 700 psi, an elongation of greater than 525%, and/or a hardness of less than 90 Shore A.

The following specific examples are provided to illustrate, but not limit, the preparation of the basecoat and topcoat polyurethane formulations as discussed above.

EXAMPLES

TABLE 2

| Basecoat Formulations | | | | | |
|---|---|---|---|---|---|
| Items | Batch | Comparative A | Example 1 | Example 2 | Example 3 |
| — | COMPONENT | WT % | WT % | WT % | WT % |
| 10 | Polyalkylene diol glycol MW4K | 14.9 | 15.3 | 18.9 | 18.3 |

TABLE 2-continued

Basecoat Formulations

| Items | Batch | Comparative A | Example 1 | Example 2 | Example 3 |
|---|---|---|---|---|---|
| 20 | Polyalkylene triol glycol MW6K | 24.8 | 25.6 | 28.6 | 28.6 |
| 30 | Polyalkylene diol glycol MW2K | 8.4 | 8.7 | 13.7 | 10.4 |
| 40 | Polyalkylene diol glycol MW1K | 0 | 0 | 0 | 0 |
| 50 | Suspension aid | 0.1 | 0.1 | 0.1 | 0.1 |
| 60 | Blocking agent | 0.3 | 0.3 | 0.4 | 0.3 |
| 70 | Catalyst | 0.1 | 0.1 | 0.1 | 0.1 |
| 80 | Phosphoric acid 85% | <0.1 | <0.1 | <0.1 | <0.1 |
| 90 | Stabilizer | 0.8 | 0.8 | 0.9 | 0.8 |
| 100 | Pigmenting agent | 1.1 | 1.1 | 1.1 | 1.1 |
| 110 | Inorganic Filler | 26.9 | 28.1 | 17.7 | 19.5 |
| 140 | Hydrophilic fumed silica | 0.1 | 0.1 | 0.1 | 0.1 |
| 150 | Epoxy functional silane | 0.4 | 0.4 | 0.4 | 0.4 |
| 160 | Latent Hardener(oxazolidine) | 0.6 | 0.6 | 0.8 | 0.8 |
| 170 | Mineral Spirit | 15.1 | 5.8 | 8.5 | 3.8 |
| 180 | p-chlorobenzotrifluoride (PCBTF) | 0.0 | 6.4 | 0.0 | 7.5 |
| 190 | Aromatic diisocyanate (TDI) | 6.4 | 6.6 | 8.6 | 8.2 |
| 200 | Black pigment | <0.1 | <0.1 | <0.1 | <0.1 |
| Total Weight | | 100 | 100 | 100 | 100 |

Procedure for Comparative Example A and Examples 1-3

Step A: Items 10 to 50 were added to a mixer and mixed at low shear for 10 minutes followed by mixing at low and high shear for an additional 10 minutes.
Step B: Items 60 to 150 were then added to the mix and mixed at low shear to wet out, vacuum mixed, heated to 140° F., and mixed at low and high shear for 20 minutes.
Step C: Item 160 was then added to the mix and mixed at low shear for 10 minutes, vacuum mixed, mixed at low and high shear, and the percent of water in the mixture was tested.
Step D: The mixture was cooled to 110° F., items 170 to 190 were then added to the mix and mixed at low shear for 10 minutes followed by mixing at low and high shear until final % NCO was achieved.
Step E: Item 200 was then added to the mix and mixed applying a vacuum.

Procedure for Examples 4-7

Step A: Items 10 to 50 were added to a mixer and mixed at low shear for 10 minutes followed by mixing at low and high shear for an additional 10 minutes.
Step B: Items 60 to 150 were then added to the mix and mixed at low shear to wet out, vacuum mixed, heated to 140° F., and mixed at low and high shear for 20 minutes.
Step C: Item 160 was then added to the mix and mixed at low shear for 10 minutes, vacuum mixed, mixed at low and high shear, and the percent of water in the mixture was tested.
Step D: The mixture was cooled to 110° F., items 170 to 190 were then added to the mix and mixed at low shear for 10 minutes followed by mixing at low and high shear until final % NCO was achieved.
Step E: Item 200 was then added to the mix and mixed applying a vacuum.

TABLE 3

Basecoat Formulations

| Items | Batch | Example 4 | Example 5 | Example 6 | Example 7 |
|---|---|---|---|---|---|
| — | COMPONENT | WT | WT | WT | WT |
| 10 | Polyalkylene diol glycol MW4K | 18.4 | 18.8 | 18.3 | 18.8 |
| 20 | Polyalkylene triol glycol MW6K | 25.6 | 24.9 | 28.6 | 24.9 |
| 30 | Polyalkylene diol glycol MW2K | 13.2 | 10.5 | 10.9 | 11.0 |
| 40 | Polyalkylene diol glycol MW1K | 0 | 5.6 | 0 | 5.6 |
| 50 | Suspension aid | 0.1 | 0.1 | 0.1 | 0.1 |
| 60 | Blocking agent | 0.3 | 0.3 | 0.3 | 0.3 |
| 70 | Catalyst | 0.1 | 0.1 | 0.1 | 0.1 |
| 80 | Phosphoric acid 85% | <0.1 | <0.1 | <0.1 | <0.1 |
| 90 | Stabilizer | 0.8 | 0.8 | 0.8 | 0.8 |
| 100 | Pigmenting agent | 1.1 | 1.1 | 1.1 | 1.1 |
| 110 | Inorganic Filler | 19.8 | 16.2 | 19.5 | 16.2 |
| 140 | Hydrophilic fumed silica | 0.1 | 0.1 | 0.1 | 0.1 |
| 150 | Epoxy functional silane | 0.4 | 0.4 | 0.4 | 0.4 |
| 160 | Latent Hardener(oxazolidine) | 0.7 | 0.7 | 0.8 | 0.7 |
| 170 | Mineral Spirit | 3.8 | 3.9 | 3.8 | 3.9 |
| 180 | p-chlorobenzotrifluoride (PCBTF) | 7.2 | 7.4 | 7.4 | 7.4 |
| 190 | Aromatic thisocyanate | 8.4 | 9.0 | 7.7 | 8.5 |
| 200 | Black pigment | <0.1 | <0.1 | <0.1 | <0.1 |
| Total Weight | | 100 | 100 | 100 | 100 |

TABLE 4

Basecoat Properties

| Batch | Comparative A | Example 1 | Example 2 | Example 3 |
|---|---|---|---|---|
| VOC, g/Liter | 194 | 96.7 | 96.4 | 48.9 |
| Viscosity, poise | 46.7 | 58 | 43 | 34.7 |
| Solvent | 15.1% Mineral Spirit | 5.8% Mineral Spirit 6.4% PCBTF | 8.52% Mineral Spirit | 3.8% Mineral Spirit 7.46% PCBTF |
| Solid, Wt. % | 83.4 | 86.3 | 91.5 | 88.7 |
| Solid, Vol % | 75.4 | 83 | 87.7 | 87.6 |
| Polymer, Wt. % | 55.4 | 57.1 | 71.1 | 66.7 |
| Polymer, Vol % | 63.3 | 69.1 | 78.1 | 76.5 |
| NCO/OH equiv. ratio | 2.050 | 2.052 | 2.11 | 2.22 |
| Final % NCO | 1.57 | 1.62 | 2.19 | 2.16 |
| EW of Polymer | 2675 | 2592 | 1917 | 1944 |
| OH equivalents | 0.0357 | 0.0368 | 0.0469 | 0.0426 |
| NCO equivalents | 0.0732 | 0.0755 | 0.0991 | 0.0941 |
| Polyols | Polyalkylene diol/triol glycol | Polyalkylene diol/triol glycol | Polyalkylene diol/triol glycol | Polyalkylene diol/triol glycol |
| Isocyanate | Aromatic | Aromatic | Aromatic | Aromatic |
| Weight/Gallon, LBS | 9.8 | 10.45 | 9.45 | 9.92 |
| RT Cure, Days | 14 | 14 | 14 | 14 |
| Tensile Strength | 361 psi | 806 psi | 1,090 psi | 919 psi |
| 100% Modulus | 154 psi | 289 psi | 270 psi | 295 psi |
| Elongation | 985% | 852% | 1043% | 918% |
| Hardness, Shore A | 43.6 | 56.3 | 56.4 | 55.8 |

25

TABLE 5

Basecoat Properties

| Batch | Example 4 | Example 5 | Example 6 | Example 7 |
|---|---|---|---|---|
| VOC, g/Liter | 48.8 | 48.9 | 49.1 | 49.1 |
| Viscosity, poise | 44.1 | 44.8 | 57 | 66.6 |
| Solvent | 3.8% Mineral Spirit 7.2% PCBTF | 3.9% Mineral Spirit 7.39% PCBTF | 3.8% Mineral Spirit 7.44% PCBTF | 3.9% Mineral Spirit 7.37% PCBTF |
| Solid, Wt. % | 88.7 | 88.7 | 88.7 | 88.7 |
| Solid, Vol % | 87.6 | 87.8 | 87.6 | 87.8 |
| Polymer, Wt. % | 66.8 | 70 | 66.7 | 70 |
| Polymer, Vol % | 76.6 | 78.3 | 76.5 | 78.3 |
| NCO/OH equiv. ratio | 2.18 | 1.99 | 2.03 | 1.85 |
| Final % NCO | 2.2 | 2.15 | 1.88 | 1.88 |
| EW of Polymer | 1909 | 1953 | 2226 | 2231 |
| OH equivalents | 0.0443 | 0.0523 | 0.0435 | 0.0528 |
| NCO equivalents | 0.0966 | 0.1033 | 0.0884 | 0.0976 |
| Polyols | Polyalkylene diol/triol glycol | Polyalkylene diol/triol glycol | Polyalkylene diol/triol glycol | Polyalkylene diol/triol glycol |
| Isocyanate | Aromatic | Aromatic | Aromatic | Aromatic |
| Weight/Gallon, LBS | 9.93 | 9.7 | 9.9 | 9.68 |
| RT Cure, Days | 26 | 13 | 14 | 21 |
| Tensile Strength | 888 psi | 919 psi | 726 psi | 768 psi |
| 100% Modulus | 303 psi | 241 psi | 214 psi | 188 psi |
| Elongation | 918% | 1105% | 852% | 1081% |
| Hardness, Shore A | 57.4 | 53.7 | 53 | 53.2 |

TABLE 6

Topcoat Formulations

| Items | Batch COMPONENT | Comparative B WT | Example 8 WT | Example 9 WT | Example 10 WT | Example 11 WT |
|---|---|---|---|---|---|---|
| 10 | Polyalkylene diol glycol MW1K | 16 | 17.6 | 20.4 | 20.4 | 19.1 |
| 20 | Polyalkylene diol glycol MW4K | 8.3 | 9 | 10.6 | 11.5 | 10 |
| 30 | Polyalkylene triol glycol MW6K | 13.9 | 15.3 | 17.8 | 17.8 | 16.7 |
| 40 | Suspension aid | 0.05 | 0.05 | 0.05 | 0.05 | 0.05 |
| 50 | Silicone | 0.01 | <0.02 | <0.02 | <0.02 | <0.02 |
| 60 | Blocking agent | 0.3 | 0.3 | 0.3 | 0.3 | 0.3 |
| 70 | Catalyst | 0.4 | 0.4 | 0.3 | 0.3 | 0.3 |
| 80 | UV stabilizer | 2 | 2 | 2.1 | 2 | 2 |

TABLE 6-continued

Topcoat Formulations

| Items | Batch COMPONENT | Comparative B WT | Example 8 WT | Example 9 WT | Example 10 WT | Example 11 WT |
|---|---|---|---|---|---|---|
| 110 | Pigmenting agent | 3.1 | 3.1 | 3.2 | 3.1 | 3.1 |
| 120 | Inorganic Filler | 17.7 | 14.7 | 12.5 | 13.8 | 13.2 |
| 140 | Hydrophilic fumed silica | 0.8 | 0.8 | 0.2 | 0.4 | 0.8 |
| 150 | Mineral Spirit | 18.4 | 7.4 | 8.5 | 8.5 | 3.7 |
| 160 | p-chlorobenzotrifluoride (PCBTF) | 0.0 | 9.9 | 0.0 | 0.0 | 10.9 |
| 170 | Cycloaliphatic Diisocyanate | 18.8 | 18.9 | 23.6 | 21.4 | 19.3 |
| 180 | Black Pigment | 0.2 | 0.5 | 0.5 | 0.5 | 0.5 |
| Total Weight (rounding) | | 100 | 100 | 100 | 100 | 100 |

Procedure for Comparative Example B and Examples 8-11

Step A: Items 10 to 70 were added to a mixer and mixed at low shear for 10 minutes followed by mixing at low and high shear for an additional 10 minutes.

Step B: Items 80 to 140 were then added to the mix and mixed at low shear to wet out, vacuum mixed, heated to 140° F., mixed at low and high shear for 20 minutes, and the percent of water in the mixture was tested.

Step C: The mixture was cooled to 110° F., items 150 to 170 were then added to the mix and mixed at low shear for 10 minutes followed by mixing at low and high shear until final % NCO was achieved.

Step D: Item 180 was then added to the mix and mixed applying a vacuum.

TABLE 7

Topcoat Formulations

| Items | Batch COMPONENT | Example 12 WT | Example 13 WT | Example 14 WT | Example 15 WT | Example 16 WT |
|---|---|---|---|---|---|---|
| 10 | Polyalkylene diol glycol MW1K | 17 | 17.2 | 19.1 | 20.5 | 17.1 |
| 20 | Polyalkylene diol glycol MW4K | 13.3 | 15.6 | 13 | 14 | 14.2 |
| 30 | Polyalkylene triol glycol MW6K | 15.7 | 13.1 | 13.5 | 11.3 | 15.7 |
| 40 | Suspension aid | 0.05 | 0.05 | 0.05 | 0.05 | 0.05 |
| 50 | Silicone | <0.02 | <0.02 | <0.02 | <0.02 | <0.02 |
| 60 | Blocking agent | 0.3 | 0.3 | 0.3 | 0.3 | 0.3 |
| 70 | Catalyst | 0.3 | 0.3 | 0.3 | 0.3 | 0.3 |
| 80 | UV stabilizer | 2 | 2 | 2 | 2 | 2 |
| 110 | Pigmenting agent | 3 | 3 | 3 | 3 | 3 |
| 120 | Inorganic Filler | 13.2 | 13.2 | 13.2 | 13.2 | 13.2 |
| 140 | Hydrophilic fumed silica | 0.8 | 0.8 | 0.8 | 0.7 | 0.8 |
| 150 | Mineral Spirit | 3.7 | 3.7 | 3.7 | 3.7 | 3.8 |
| 160 | p-chlorobenzotrifluoride (PCBTF) | 11.4 | 11.6 | 11.5 | 12.1 | 11.5 |
| 170 | Cycloaliphatic Diisocyanate | 18.7 | 18.7 | 19 | 18.5 | 17.7 |
| 180 | Black Pigment | 0.5 | 0.5 | 0.5 | 0.5 | 0.5 |
| Total Weight (rounding) | | 100 | 100 | 100 | 100 | 100 |

Procedure for Examples 12-16

Step A: Items 10 to 70 were added to a mixer and mixed at low shear for 10 minutes followed by mixing at low and high shear for an additional 10 minutes.

Step B: Items 80 to 140 were then added to the mix and mixed at low shear to wet out, vacuum mixed, heated to 140° F., mixed at low and high shear for 20 minutes, and the percent of water in the mixture was tested.

Step C: The mixture was cooled to 110° F., items 150 to 170 were then added to the mix and mixed at low shear for 10 minutes followed by mixing at low and high shear until final % NCO was achieved.

Step D: Item 180 was then added to the mix and mixed applying a vacuum.

TABLE 8

Topcoat Properties

| Batch | Comparative B | Example 8 | Example 9 | Example 10 | Example 11 |
|---|---|---|---|---|---|
| VOC, g/Liter | 205 | 94.8 | 94.7 | 95 | 49.1 |
| Viscosity, poise | 25.3 | 46 | 34.4 | 40.3 | 43 |
| Solvent | 18.4% Mineral Spirit | 7.4% Mineral Spirit 9.9% PCBTF | 8.45% Mineral Spirit | 8.47% Mineral Spirit | 3.7% Mineral Spirit 10.9% PCBTF |
| Solid, Wt. % | 81.5 | 82.3 | 91.5 | 91.5 | 85.4 |
| Solid, Vol % | 73.81 | 80.1 | 88 | 87.9 | 84.9 |
| Polymer, Wt. % | 57.7 | 61.5 | 73.1 | 71.7 | 65.8 |
| Polymer, Vol % | 62.4 | 69.1 | 78.8 | 78.1 | 74.5 |
| NCO/OH equiv. ratio | 3.292 | 3.01 | 3.23 | 2.9 | 2.81 |
| Final % NCO | 4.16 | 4.0 | 5.19 | 4.46 | 3.95 |
| EW of Polymer | 1009 | 1050 | 808 | 940 | 1063 |
| OH equivalents | 0.0432 | 0.0476 | 0.0554 | 0.0557 | 0.052 |
| NCO equivalents | 0.1423 | 0.1431 | 0.1791 | 0.1621 | 0.1462 |
| Polyols | Polyalkylene diol/triol glycol | Polyalkylene diol/triol glycol | Polyalkylene diol/triol glycol | Polyalkylene diol/triol glycol | Polyalkylene diol/triol glycol |
| Isocyanate | Cycloaliphatic | Cycloaliphatic | Cycloaliphatic | Cycloaliphatic | Cycloaliphatic |
| Weight/Gallon, LBS | 9.3 | 9.73 | 9.25 | 9.33 | 9.74 |
| Tack-free Film | Next Day | Next Day | Next Day | Next Day | Next Day |
| RT Cure, Days | 14 | 14 | 15 | 14 | 21 |
| Tensile Strength | 2348 psi | 3063 psi | 3292 psi | 3292 psi | 3158 psi |
| 100% Modulus | 1009 psi | 1054 psi | 1141 psi | 1051 psi | 911 psi |
| Elongation | 521% | 631% | 578% | 606% | 646% |
| Hardness, Shore A | 86.3 | 83.2 | 86.4 | 83.8 | 84.7 |

TABLE 9

Topcoat Properties

| Batch | Example 12 | Example 13 | Example 14 | Example 15 | Example 16 |
|---|---|---|---|---|---|
| VOC, g/Liter | 49.2 | 48.9 | 49.1 | 49 | 49.1 |
| Viscosity, poise | 45.2 | 37.8 | 33.8 | 40.4 | 40.4 |
| Solvent | 3.7% Mineral Spirit 11.4% PCBTF | 3.67% Mineral Spirit 11.6% PCBTF | 3.69% Mineral Spirit 11.47% PCBTF | 3.65% Mineral Spirit 12.08% PCBTF | 3.7% Mineral Spirit 11.5% PCBTF |
| Solid, Wt. % | 84.8 | 84.7 | 84.8 | 84.2 | 84.7 |
| Solid, Vol % | 84.5 | 84.3 | 84.4 | 84 | 84.4 |
| Polymer, Wt % | 65.3 | 65.1 | 65.3 | 64.7 | 65.1 |
| Polymer, Vol % | 73.7 | 73.6 | 73.7 | 73.2 | 73.7 |
| NCO/OH equiv. ratio | 2.89 | 2.88 | 2.77 | 2.6 | 2.7 |
| Final % NCO | 3.88 | 3.87 | 3.86 | 3.6 | 3.52 |
| EW of Polymer | 1082 | 1085 | 1087 | 1165 | 1192 |
| OH equivalents | 0.0488 | 0.0491 | 0.0519 | 0.0539 | 0.0494 |
| NCO equivalents | 0.1413 | 0.1413 | 0.1446 | 0.1394 | 0.1333 |
| Polyols | Polyalkylene diol/triol glycol | Polyalkylene diol/triol glycol | Polyalkylene diol/triol glycol | Polyalkylene diol/triol glycol | Polyalkylene diol/triol glycol |
| isocyanate | Cycloaliphatic | Cycloaliphatic | Cycloaliphatic | Cycloaliphatic | Cycloaliphatic |
| Weight/Gallon, LBS | 9.75 | 9.76 | 9.75 | 9.76 | 9.75 |
| Tack-free Firm | Next Day | Next Day | Next Day | Next Day | Next Day |
| RT Cure, Days | 14 | 27 | 14 | 15 | 14 |
| Tensile Strength | 3062 psi | 3148 psi | 3158 psi | 3150 psi | 3089 psi |
| 100% Modulus | 886 psi | 913 psi | 872 psi | 835 psi | 787 psi |
| Elongation | 702% | 766% | 668% | 758% | 742% |
| Hardness, Shore A | 84.5 | 83.5 | 86.8 | 82.3 | 80.9 |

Figure 2:
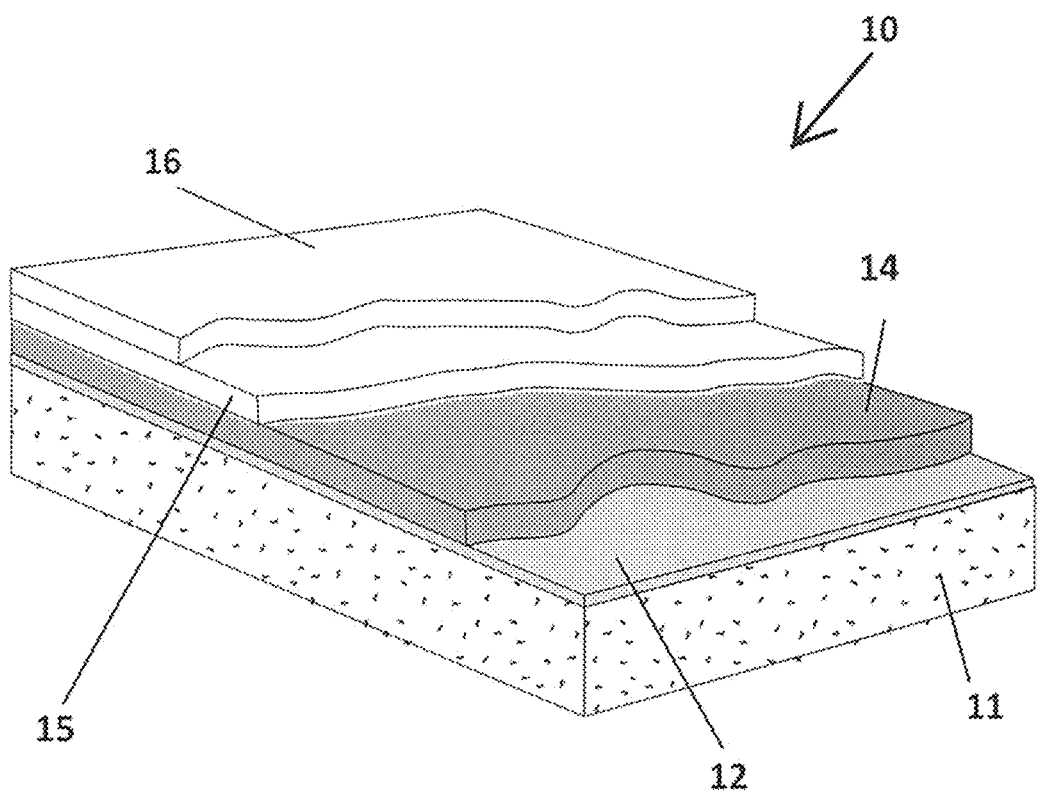
FIG. 2 is a cutaway perspective view of a polyurethane membrane comprising an optional primer over the substrate, a basecoat, a topcoat and an optional second topcoat.

Referring to FIGS. 1 and 2, a coating 10, such as a deck coating or deck membrane is prepared by applying a basecoat composition described above to a substrate 11, such as concrete, to form a basecoat 14. The substrate 11 may be precoated with an optional primer 12, and/or may be pretreated with a solvent or by mechanical roughening. Typical primers may include a one-component, solvent-based primer and sealer such as MasterSeal™ P 222, or a two-component, waterborne, epoxy primer and sealer, such as MasterSeal™ P 220, both available from BASF Corporation. After drying, a topcoat composition as described above is applied to the basecoat 14 to form a topcoat 15. An optional second topcoat 16 may be formed by applying the same or a different topcoating composition to the dried topcoat 15. The coating compositions may be roller applied, or applied by other means known in the art, such as with a brush or sprayed. An aggregate, such as sand, may optionally be cast onto the surface of the outermost topcoat 15 or 16, optionally prior to full drying, in order to provide a roughened texture.

Utilizing the subject coatings, fewer mils thickness of the "wet" coatings may be applied, and achieving the same "dry" mils thickness of coatings as those having high VOC components. Additionally, a lower volume of deck membrane materials having a low VOC according to the subject embodiments can provide the same performance as the higher volume of those deck membrane materials having high VOC. The products are thus more environmentally friendly than conventional deck membranes.

It will be understood that the embodiment(s) described herein is/are merely exemplary, and that one skilled in the art may make variations and modifications without departing from the spirit and scope of the invention. All such variations and modifications are intended to be include within the scope of the invention as described hereinabove. Further, all embodiments disclosed are not necessarily in the alternative, as various embodiments of the invention may be combined.

The invention claimed is:

1. A topcoat coating formulation comprising an aliphatic polyurethane pre-polymer having isocyanate terminal end groups, a first solvent and optionally a second VOC-exempt solvent, a catalyst, and at least one filler, in which the total formulation has a VOC content of less than or equal to 95 g/L, the prepolymer having an equivalent molecular weight of about 500-10000 g/mol and an NCO/OH ratio of about 1.1 to 3.3, and being the reaction product of about 51 wt % to about 100 wt % aliphatic polyisocyanate, 0 wt % to about 49 wt % aromatic polyisocyanate, and a polyol selected from the group consisting of polyoxyalkylene polyols, polyester polyols, and polycarbonate polyols, wherein the weight percent of polyol to polyisocyanate reacted to form the pre-polymer is in the range of between about 57 to about 87% by weight, based on the weight of the pre-polymer, wherein the weight percent of the pre-polymer based on the weight of the total topcoat coating formulation is about 57.7% to about 95%, and the total weight percent solids in the topcoat coating formulation is greater than 82% to about 99%, wherein the total formulation viscosity is less than 80 poise at greater than 82% solids, and wherein the topcoat coating reaction product has a 100% modulus of greater than 700 psi.

2. The formulation of claim 1, wherein the topcoat coating reaction product has a % NCO in a range of about 3.5% to about 6%.

3. The formulation of claim 1, wherein the topcoat coating reaction product has a tensile strength of greater than 2400 psi.

4. The formulation of claim 1, wherein the topcoat coating reaction product has an elongation of greater than 525%.

5. The formulation of claim 1, wherein the topcoat coating reaction product has a hardness of less than 90 Shore A.

6. The formulation of claim 1, wherein the polyisocyanate of the topcoat pre-polymer comprises a cycloaliphatic polyisocyanate.

7. The formulation of claim 1, wherein the formulation comprises at least one of organic fillers, inorganic fillers, a pigment or colorant, a plasticizer or surfactant, chain extenders, antioxidants, UV stabilizers, light stabilizers, thermal stabilizers, fungicides, mildewcides, biocides, fire retardants, surface additives, coloring agents, mineral oils, dispersing agents, adhesion promoters, defoaming agents, storage stabilizers, latent hardeners, cure retarders, drying agents, lubricants, suspension aids, blocking agents, or mixtures thereof.

8. A membrane system comprising an optional primer coating, a basecoat and the topcoat of claim 1.

9. The system defined in claim 8, wherein the membrane system is a deck membrane.

10. A method of producing a coating membrane having a basecoat and the topcoat of claim 1, comprising treating a substrate, applying a moisture curable basecoat coating formulation to the substrate, and after drying, applying a moisture curable topcoat coating formulation to the basecoat, optionally followed by broadcasting aggregate onto the topcoat.

11. The method of claim 10, wherein said treating is selected from roughening the substrate chemically or mechanically, or applying a primer to the substrate.

* * * * *